(12) United States Patent
Li et al.

(10) Patent No.: US 12,172,658 B2
(45) Date of Patent: Dec. 24, 2024

(54) AUTONOMOUS DRIVING CONTROL SYSTEM AND CONTROL METHOD AND DEVICE

(71) Applicants: ZHEJIANG GEELY HOLDING GROUP CO., LTD, Zhejiang (CN); ZHEJIANG GEELY AUTOMOBILE RESEARCH INSTITUTE CO., LTD, Zhejiang (CN)

(72) Inventors: Bo Li, Ningbo (CN); Xuefeng Li, Ningbo (CN)

(73) Assignees: ZHEJIANG GEELY HOLDING GROUP CO., LTD, Hangzhou (CN); ZHEJIANG GEELY AUTOMOBILE RESEARCH INSTITUTE CO., LTD, Taizhou (CN)

( * ) Notice: Subject to any disclaimer, the term of this patent is extended or adjusted under 35 U.S.C. 154(b) by 261 days.

(21) Appl. No.: 17/783,992

(22) PCT Filed: Sep. 17, 2020

(86) PCT No.: PCT/CN2020/115797
§ 371 (c)(1),
(2) Date: Jun. 9, 2022

(87) PCT Pub. No.: WO2021/114794
PCT Pub. Date: Jun. 17, 2021

(65) Prior Publication Data
US 2023/0011677 A1    Jan. 12, 2023

(30) Foreign Application Priority Data
Dec. 9, 2019   (CN) .......................... 201911247246.8

(51) Int. Cl.
*B60W 50/029*    (2012.01)
*B60W 50/02*    (2012.01)
(Continued)

(52) U.S. Cl.
CPC ...... *B60W 50/029* (2013.01); *B60W 50/0205* (2013.01); *B60W 50/023* (2013.01); *B60W 60/001* (2020.02); *B60W 2050/0292* (2013.01)

(58) Field of Classification Search
CPC ..... B60W 2050/0292; B60W 50/0205; B60W 50/029; B60W 50/023; B60W 50/02;
(Continued)

(56) References Cited

U.S. PATENT DOCUMENTS 5,142,474 A * 8/1992 Miyata ...................... B60T 8/48
701/29.2
5,684,702 A    11/1997 Phillips et al.
(Continued)

FOREIGN PATENT DOCUMENTS

CN    101430560 A    5/2009
CN    107407910 A    11/2017
(Continued)

OTHER PUBLICATIONS

Search Report for China Patent Application No. 201911247246.8 dated Jan. 2, 2020 (3 pages).
(Continued)

*Primary Examiner* — Khoi H Tran
*Assistant Examiner* — Tanner L Cullen
(74) *Attorney, Agent, or Firm* — Westbridge IP LLC

(57) ABSTRACT

An autonomous driving control system, comprising a main control system and a backup control system. The main control system comprises a main control module and main execution modules, and the backup control system comprises a backup control module and backup execution modules; the main control module monitors an operating status of the main control system in real time; the main control module further sends, when detecting that a failure occurs in the main control system, a failure notification to the backup (Continued)

control module, and sends a response termination control instruction to each of the main execution modules, the response termination control instruction being a control instruction for instructing each of the main execution modules not to respond to any control over a vehicle; and the backup control module controls, after receiving the failure notification, the backup execution modules to start to execute a backup control instruction.

15 Claims, 1 Drawing Sheet

(51) Int. Cl.
*B60W 50/023* (2012.01)
*B60W 60/00* (2020.01)

(58) Field of Classification Search
CPC ..... B60W 2050/0297; B60W 60/0015; B60W 2050/0005; B60W 60/001; G05D 1/0077; G05D 2201/0213; G05B 9/03; G05B 2219/24175; G06F 11/2028
See application file for complete search history.

(56) References Cited

U.S. PATENT DOCUMENTS

| | | | |
|---|---|---|---|
| 11,584,433 B2 | 2/2023 | Akutsu | |
| 2001/0056304 A1* | 12/2001 | Nitta | G05B 19/0428 700/21 |
| 2004/0064220 A1* | 4/2004 | Kobayashi | B60T 8/321 701/1 |
| 2014/0277608 A1 | 9/2014 | Debouk et al. | |
| 2015/0193991 A1* | 7/2015 | Zhang | G07C 5/08 701/32.7 |
| 2016/0034363 A1 | 2/2016 | Poledna | |
| 2016/0104327 A1 | 4/2016 | Ghannam et al. | |
| 2018/0136653 A1* | 5/2018 | Tao | B60W 60/0016 |
| 2019/0168803 A1 | 6/2019 | Miller et al. | |
| 2019/0337526 A1* | 11/2019 | Rave | G06F 21/554 |
| 2019/0361439 A1* | 11/2019 | Zeng | G06V 20/56 |
| 2021/0070312 A1* | 3/2021 | Decius | B60W 50/04 |
| 2021/0163026 A1 | 6/2021 | Ochida et al. | |

FOREIGN PATENT DOCUMENTS

| | | |
|---|---|---|
| CN | 109367501 A | 2/2019 |
| CN | 109878572 A | 6/2019 |
| CN | 109917779 A | 6/2019 |
| CN | 110077420 A | 8/2019 |
| CN | 110235358 A | 9/2019 |
| CN | 110254439 A | 9/2019 |
| CN | 110682920 A | 1/2020 |
| CN | 110745144 A | 2/2020 |
| JP | 03-260702 B2 | 2/2002 |
| JP | 2018-90169 A | 6/2018 |
| JP | 2019-006188 A | 1/2019 |
| JP | 2019-111866 | 7/2019 |
| KR | 20190094531 A | 8/2019 |
| WO | WO 2018/220811 A1 | 12/2018 |

OTHER PUBLICATIONS $1^{st}$ Office Action for China Patent Application No. 201911247246.8 dated Jan. 19, 2020 (7 pages).
$2^{nd}$ Office Action for China Patent Application No. 201911247246.8 dated Feb. 17, 2020 (3 pages).
Notice of Grant for China Patent Application No. 201911247246.8 dated Mar. 1, 2020 (3 pages).
$1^{st}$ Office Action for EP Patent Application No. 20897937.7 dated Apr. 26, 2023 (6 pages).
$1^{st}$ Office Action for Japan Patent Application No. 2022-533107 (7 pages).
International Search Report and Written Opinion for PCT/CN2020/115797 (ISA/CN) mailed Dec. 17, 2020 (17 pages).
Decision to Grant a Patent issued in counterpart Japanese Patent Application No. JP 2022-533107, dated Jun. 18, 2024.
Request for the Submission of an Opinion issued in counterpart Korean Patent Application No. KR 10-2022-7020436, dated May 10, 2024.

* cited by examiner

AUTONOMOUS DRIVING CONTROL SYSTEM AND CONTROL METHOD AND DEVICE

CROSS-REFERENCE TO RELATED APPLICATIONS

The present application is a national phase entry of International Application No. PCT/CN2020/115797, filed Sep. 17, 2020, claims priority to Chinese Patent Application No. 201911247246.8 filed on Dec. 9, 2019, and entitled "AUTONOMOUS DRIVING CONTROL SYSTEM AND CONTROL METHOD AND DEVICE", which are incorporated herein by reference in their entireties.

FIELD OF THE INVENTION

The present invention relates to autonomous driving, and in particular to an autonomous driving control system and a control method and device.

BACKGROUND OF THE INVENTION

Automobiles are developing in four areas: automation, networking, electrification, and sharing, in which the autonomous driving technology is the top priority in the current development of the automotive industry, which not only has a huge impact on the development of the industry, but also leads a major change in the future travel model. In the future, in order to further achieve highly autonomous driving systems of L3 and L4 levels, the reliability of the systems needs to be improved comprehensively, which places higher requirements on perception, decision-making and execution systems as well as software and hardware devices. The backup redundancy of a controller and an actuation mechanism is indispensable to achieving highly autonomous driving.

The highly autonomous driving of L3 and L4 levels requires a higher reliability to perform a driving task in order to free a driver from the driving task and provide the driver with an Eyes-Off and Minds-Off driving experience. In order to achieve such a system with a high reliability, the controller and the actuation mechanism need to achieve an ASIL D-level functional safety and reliability, whereas an existing autonomous driving system with a single Electronic Control Unit (ECU) and architecture cannot achieve the ASIL D-level functional safety and reliability.

BRIEF DESCRIPTION OF THE INVENTION

For the above problem of the prior art, an object of the present invention is to provide an autonomous driving control system and a control method and device, so as to solve the problem that an existing single-architecture autonomous driving control system cannot operate normally when any controller or actuation mechanism fails at a single point.

A first aspect of the present invention provides an autonomous driving control system. The control system includes a main control system and a backup control system, the main control system including a main control module and main execution modules, and the backup control system including a backup control module and backup execution modules, wherein the main control module is configured to monitor an operating status of the main control system in real time, the main control module is further configured to send, when detecting that a failure occurs in the main control system, a failure notification to the backup control module, and send a response termination control instruction to each of the main execution modules, the response termination control instruction being a control instruction for instructing each of the main execution modules not to respond to any control over a vehicle, and the backup control module is configured to control, after receiving the failure notification, the backup execution modules to start to execute a backup control instruction.

Further, the backup control module is configured to send, after receiving the failure notification, the backup control instruction to the backup execution modules; and the backup execution modules are configured to execute the backup control instruction.

Further, the backup control module is configured to send the backup control instruction to the backup execution modules; the backup control module is further configured to send, after receiving the failure notification, a first response control instruction to the backup execution modules, the first response control instruction being a control instruction for instructing each of the backup execution modules to start to respond to the backup control instruction; and the backup execution modules are configured to start, on the basis of the first response control instruction, to execute the backup control instruction.

Further, the backup control module is further configured to decompose the backup control instruction and sending a decomposed backup control instruction to corresponding backup execution modules respectively, such that each of the backup execution modules controls the vehicle according to the decomposed backup control instruction.

Further, the operating status of the main control system includes: an operating status of the main control module, any one of the main execution modules, and a main communication network.

Further, the backup control module is configured to determine whether communication with the main control module is interrupted, and control, after determining that the communication with the main control module is interrupted, the backup execution modules to start to execute the backup control instruction.

Further, the main execution modules are configured to determine whether communication with the main control module is interrupted, and interrupt work after determining that the communication with the main control module is interrupted.

Further, the main control module is configured to send a main control instruction and a second response control instruction to the main execution modules, the second response control instruction being a control instruction for instructing each of the main execution modules to respond to the main control instruction and instructing each of the backup execution modules to respond to a decomposed main control instruction.

A second aspect of the present invention provides a control method for an autonomous driving control system. The autonomous driving system includes a main control system and a backup control system, the main control system including a main control module and main execution modules, and the backup control system including a backup control module and backup execution modules. The method includes: monitoring, by the main control module, an operating status of the main control system in real time; sending, by the main control module when detecting that a failure occurs in the main control system, a failure notification to the backup control module and a response termination control instruction to each of the main execution modules, the response termination control instruction being a control instruction for instructing each of the main execution modules not to respond to any control over a vehicle; and controlling, by the backup control module after receiving the failure notification, the backup execution modules to start to execute a backup control instruction.

A third aspect of the present invention provides a control device for an autonomous driving system, the device including: a processor and a memory, wherein the memory stores at least one instruction, at least one program, a code set or an instruction set, and the at least one instruction, the at least one program, the code set or the instruction set are loaded and executed by the processor to implement a control method for the autonomous driving control system.

Due to the above technical solutions, the present invention has the following advantageous effects:

The autonomous driving control system of the present invention includes a main control system and a backup control system. In a normal state, the main control system is in charge of executing a main control instruction of the autonomous driving system, and when any module in the main control system fails at a single point, the backup control system executes a backup control instruction instead, such that an autonomous driving vehicle can operate normally when any module in the main control system fails at a single point, achieving an ASIL D-level functional safety and reliability of autonomous driving.

BRIEF DESCRIPTION OF THE DRAWINGS

In order to illustrate the technical solutions of the present invention more clearly, the following is a brief description of the accompanying drawings that need to be used in the descriptions of the embodiments or the prior art. Apparently, the accompanying drawings in the following descriptions are only some embodiments of the present invention, and those of ordinary skill in the art may still derive other drawings from these drawings without creative efforts.

DETAILED DESCRIPTION

In order to enable those skilled in the art to better understand the solutions of the present invention, the technical solutions in the embodiments of the present invention will be clearly and completely described below in conjunction with the accompanying drawings in the embodiments of the present invention. Apparently, the embodiments described are only part rather than all of the embodiments of the present invention. Based on the embodiments of the present invention, all other embodiments obtained by those of ordinary skill in the art without creative efforts shall fall within the protection scope of the present invention.

It should be noted that the terms "first", "second", and the like in the description, the claims, and the drawings of the present invention are used to distinguish between similar objects and not necessarily to describe a specific sequence or order. It should be understood that data so used are interchangeable under appropriate circumstances, such that the embodiments of the present invention described herein can be implemented in a sequence other than those illustrated or described herein. In addition, the terms "include" and "have" and any variations thereof are intended to cover a non-exclusive inclusion.

Figure 1:
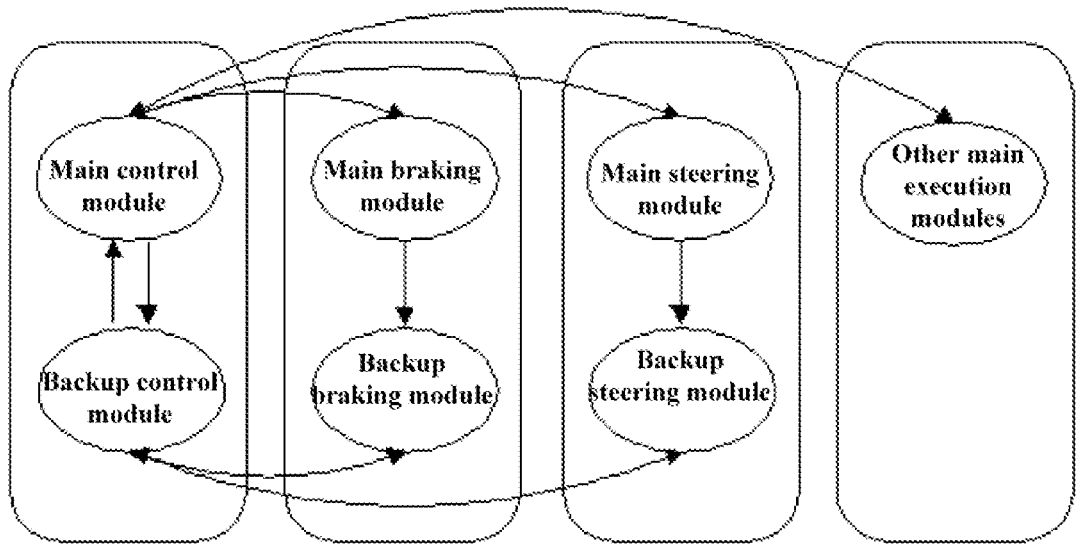
FIG. 1 is a schematic structural diagram of an autonomous driving control system provided by an embodiment of the present invention.

FIG. 1 is a schematic structural diagram of an autonomous driving control system provided by an embodiment of the present invention. As shown in FIG. 1, the autonomous driving control system includes a main control system and a backup control system, the main control system including a main control module and main execution modules, and the backup control system including a backup control module and backup execution modules.

The main control module is configured to monitor an operating status of the main control system in real time.

The main control module is further configured to send, when detecting that a failure occurs in the main control system, a failure notification to the backup control module, and send a response termination control instruction to each of the main execution modules, the response termination control instruction being a control instruction for instructing each of the main execution modules not to respond to any control over a vehicle.

The backup control module is configured to control, after receiving the failure notification, the backup execution modules to start to execute a backup control instruction.

In the embodiments of the present invention, there may be one or more main execution modules, and the main control module establishes a communication connection with the one or more main execution modules respectively; and there may be one or more backup execution modules, and the backup control module establishes a communication connection with the one or more backup execution modules respectively. In order to ensure that communication between the main control module and the backup control module is not interrupted, the main control module and the backup control module are connected via two buses.

The backup execution modules may be configured according to an actual need, for example, the main execution modules include a main braking module, a main steering module, and a main power module, and the backup execution modules only need to be configured with a backup braking module and a backup steering module according to an actual need and do not need to be configured with a backup power module.

The operating status of the main control system includes: an operating status of the main control module, any one of the main execution modules, and a main communication network. The failure occurring in the main control system includes: a failure occurring in the main control module or any one of the main execution modules, or a communication interruption between the main control module and any one of the main execution modules.

In a specific embodiment, when no failure occurs in the main control system, the backup execution modules do not receive the backup control instruction, and when a failure occurs in the main control system, the backup execution modules receive the backup control instruction and start to execute the backup control instruction, that is:

the backup control module is configured to send, after receiving the failure notification, the backup control instruction to the backup execution modules; and the backup execution modules are configured to execute the backup control instruction.

In another specific embodiment, when no failure occurs in the main control system, the backup execution modules may receive the backup control instruction but cannot execute the backup control instruction, and when a failure occurs in the main control system, the backup execution modules may start to execute the backup control instruction, that is:

the backup control module is configured to send the backup control instruction to the backup execution modules;

the backup control module is further configured to send, after receiving the failure notification, a first response control instruction to the backup execution modules, the first response control instruction being a control instruction for instructing each of the backup execution modules to start to respond to the backup control instruction; and the backup execution modules are configured to start, on the basis of the first response control instruction, to execute the backup control instruction.

In other embodiments, because there may be a plurality of backup execution modules, in order to send the backup control instruction accurately to a corresponding backup execution module, the backup control module further has the following function:

the backup control module is further configured to decompose the backup control instruction and send a decomposed backup control instruction to corresponding backup execution modules respectively, such that each of the backup execution modules controls the vehicle according to the decomposed backup control instruction.

In other embodiments, considering that when communication with the main control module is interrupted, the backup control module cannot receive the failure notification sent by the main control module, so the backup control system cannot execute the backup control instruction or cannot execute same in time when a failure occurs in the main control system. To avoid such a problem caused by interrupted communication with the main control module, the backup control module further has the following function:

the backup control module is configured to determine whether communication with the main control module is interrupted, and control, after determining that the communication with the main control module is interrupted, the backup execution modules to start to execute the backup control instruction.

In other embodiments, considering that when communication with the main control module is interrupted, the main execution modules cannot receive a response termination request sent by the main control module, so the main execution modules cannot stop an execution operation corresponding to a main control instruction in time. To avoid such a problem caused by interrupted communication with the main control module, the main execution modules further have the following function:

the main execution modules are configured to determine whether communication with the main control module is interrupted, and interrupt work after determining that the communication with the main control module is interrupted.

In other embodiments, considering that if the main control instruction is only executed by the main execution modules, the efficiency is low, in order to increase the work efficiency of autonomous driving, the main control module further has the following function:

the main control module is configured to send the main control instruction and a second response control instruction to the main execution modules, the second response control instruction being a control instruction for instructing each of the main execution modules to respond to the main control instruction and instructing each of the backup execution modules to respond to a decomposed main control instruction.

Figure 2:
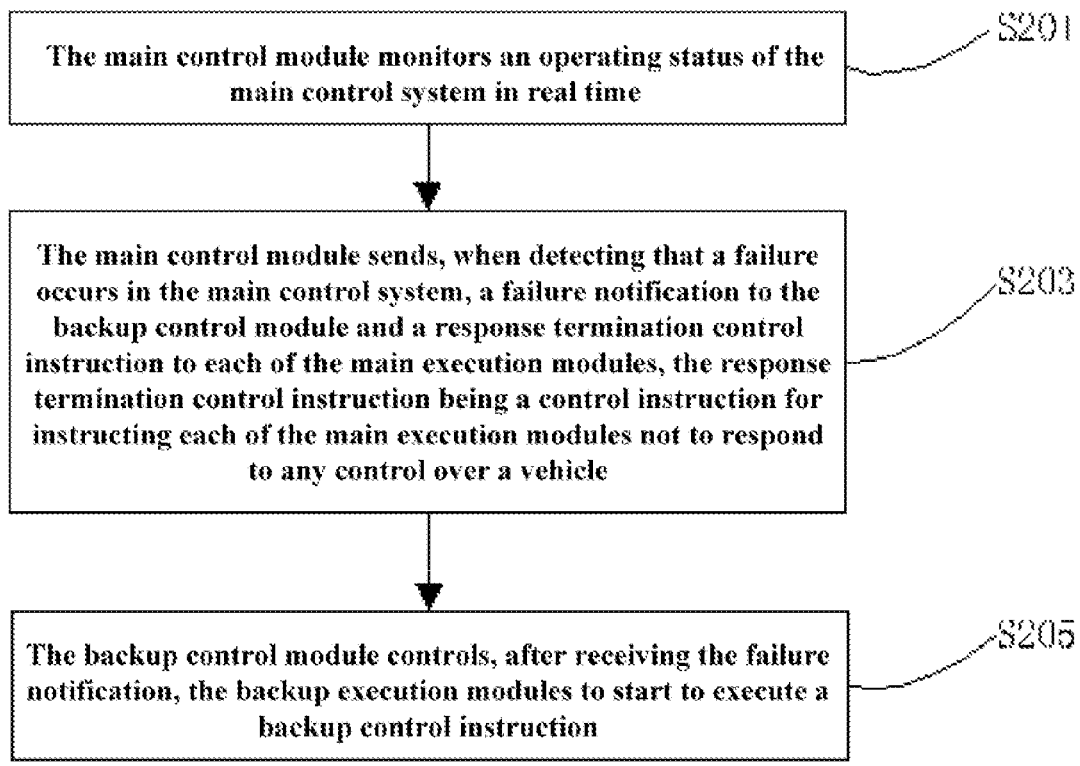
FIG. 2 is a schematic flowchart of a control method for an autonomous driving control system provided by an embodiment of the present invention.

A control method for the autonomous driving control system of the present invention will be described below. FIG. 2 is a schematic flowchart of a control method for an autonomous driving control system provided by an embodiment of the present invention. The specification provides operation steps of the method as described in the embodiments or the flowchart, but may include more or fewer operation steps based on conventional or uncreative labor. The sequence of steps listed in the embodiments is only one of many execution sequences of steps and does not represent the only execution sequence. When it is executed actually by a control apparatus product of the autonomous driving control system, it can be executed sequentially or in parallel (for example, a parallel processor or multi-threaded processing environment) according to the methods shown in the embodiments or the accompanying drawings. As shown in FIG. 1, the autonomous driving control system includes a main control system and a backup control system, the main control system including a main control module and main execution modules, and the backup control system including a backup control module and backup execution modules. As shown in FIG. 2, the method may include:

Step S201: the main control module monitors an operating status of the main control system in real time.

Step S203: the main control module sends, when detecting that a failure occurs in the main control system, a failure notification to the backup control module and a response termination control instruction to each of the main execution modules, the response termination control instruction being a control instruction for instructing each of the main execution modules not to respond to any control over a vehicle.

In the embodiments of the present invention, the failure of the main control system includes: a failure of the main control module, any one of the main execution modules, and a main communication network.

Step S205: the backup control module controls, after receiving the failure notification, the backup execution modules to start to execute a backup control instruction.

In a specific embodiment, that the backup control module controls, after receiving the failure notification, the backup execution modules to start to execute a backup control instruction may include:

the backup control module sends, after receiving the failure notification, the backup control instruction to the backup execution modules; and the backup execution modules execute the backup control instruction.

In another specific embodiment, before the backup control module controls, after receiving the failure notification, the backup execution modules to start to execute the backup control instruction, the method may further include:

the backup control module sends the backup control instruction to the backup execution modules;

and that the backup control module controls, after receiving the failure notification, the backup execution modules to start to execute the backup control instruction may include:

the backup control module sends, after receiving the failure notification, a first response control instruction to the backup execution modules, the first response control instruction being a control instruction for instructing each of the backup execution modules to start to respond to the backup control instruction; and the backup execution modules start to execute the backup control instruction on the basis of the first response control instruction.

In other embodiments, the method may further include:

the backup control module decomposes the backup control instruction; and the backup control module sends a decomposed backup control instruction to corresponding backup execution modules respectively, such that each of the backup execution modules controls the vehicle according to the decomposed backup control instruction.

In other embodiments, the method may further include:

the backup control module determines whether communication with the main control module is interrupted, and if so, controls the backup execution modules to start to execute the backup control instruction.

In other embodiments, the main execution modules determine whether communication with the main control module is interrupted, and if so, the main execution modules interrupt work.

In other embodiments, the method may further include:

the main control module sends a main control instruction and a second response control instruction to the main execution modules, the second response control instruction being a control instruction for instructing each of the main execution modules to respond to the main control instruction and instructing each of the backup execution modules to respond to a decomposed main control instruction.

The methods in the method embodiments are based on the same inventive concept as the system embodiments.

The embodiments of the present invention further provide a control device for autonomous driving, the device including: a processor and a memory, wherein the memory stores at least one instruction, at least one program, a code set or an instruction set, and the at least one instruction, the at least one program, the code set or the instruction set are loaded and executed by the processor to implement any control method for the autonomous driving control system.

During performing embodiments of an autonomous driving control system, a method, and a device provided by the embodiments of the present invention, in a normal state, a main control system is in charge of executing a main control instruction of the autonomous driving system, and when any module in the main control system fails at a single point, a backup control system executes a backup control instruction instead, such that an autonomous driving vehicle can operate normally when any module in the main control system fails at a single point, achieving an ASIL D-level functional safety and reliability of autonomous driving.

It should be noted that the above sequence of embodiments of the present invention is only for description, and does not represent the advantages or disadvantages of the embodiments. In addition, specific embodiments of this specification have been described above. Other embodiments are within the scope of the appended claims. In some cases, the actions or steps recited in the claims may be performed in a different order from those in the embodiments and still achieve desired results. In addition, the processes depicted in the accompanying drawings do not necessarily require the particular order or sequential order shown to achieve the desired results. In some embodiments, multitasking and parallel processing are also possible or may be advantageous.

Embodiments in the specification are described in a progressive way, same and similar parts among the embodiments can refer to each other, and each embodiment focuses on differences from the other embodiments. In particular, for apparatus, terminal, and system embodiments, which are substantially similar to the method embodiments, the descriptions are relatively simple, and where relevant, reference can be made to partial descriptions of the method embodiments.

Those of ordinary skill in the art can understand that all or part of the steps for implementing the above embodiments may be completed by hardware or by a program instructing related hardware, and the program may be stored in a computer-readable storage medium, which may be a read-only memory, a magnetic disk, or an optical disc, etc.

The invention claimed is:

1. An autonomous driving control system, applied to a control device for the autonomous driving system, the device comprising a processor and a memory, the memory storing at least one instruction, at least one program, a code set or an instruction set, and the at least one instruction, the at least one program, the code set or the instruction set being loaded and executed by the processor, the control system comprising a main control system and a backup control system, the main control system comprising a main control module and main execution modules, and the backup control system comprising a backup control module and backup execution modules, wherein:

the main control module is configured to monitor an operating status of the main control system in real time;

the main control module is further configured to send, when detecting that a failure occurs in the main control system, a failure notification to the backup control module, and send a response termination control instruction to each of the main execution modules, the response termination control instruction being a control instruction for instructing each of the main execution modules not to respond to any control over a vehicle;

the backup control module is configured to control, after receiving the failure notification, the backup execution modules to start to execute a backup control instruction, the main execution modules comprises a main braking module, a main steering module, and a main power module, and the backup execution module comprises a backup braking module and a backup steering module, and the main control module is configured to send a main control instruction and a second response control instruction to the main execution modules, the second response control instruction being a control instruction for instructing each of the main execution modules to respond to the main control instruction and instructing each of the backup execution modules to respond to a decomposed main control instruction.

2. The autonomous driving control system according to claim 1, wherein the backup control module is configured to send, after receiving the failure notification, the backup control instruction to the backup execution modules; and the backup execution modules are configured to execute the backup control instruction.

3. The autonomous driving control system according to claim 2, wherein the backup control module is further configured to decompose the backup control instruction and send a decomposed backup control instruction to corresponding backup execution modules respectively, such that each of the backup execution modules controls the vehicle according to the decomposed backup control instruction.

4. The autonomous driving control system according to claim 1, wherein the backup control module is configured to send the backup control instruction to the backup execution modules;

the backup control module is further configured to send, after receiving the failure notification, a first response control instruction to the backup execution modules, the first response control instruction being a control instruction for instructing each of the backup execution modules to start to respond to the backup control instruction; and the backup execution modules are configured to start, on the basis of the first response control instruction, to execute the backup control instruction.

5. The autonomous driving control system according to claim 4, wherein the backup control module is further configured to decompose the backup control instruction and send a decomposed backup control instruction to corresponding backup execution modules respectively, such that each of the backup execution modules controls the vehicle according to the decomposed backup control instruction.

6. The autonomous driving control system according to claim 1, wherein the operating status of the main control system comprises:

an operating status of the main control module, any one of the main execution modules, and a main communication network.

7. The autonomous driving control system according to claim 1, wherein the backup control module is configured to determine whether communication with the main control module is interrupted, and control, after determining that the communication with the main control module is interrupted, the backup execution modules to start to execute the backup control instruction.

8. The autonomous driving control system according to claim 1, wherein the main execution modules are configured to determine whether communication with the main control module is interrupted, and interrupt work after determining that the communication with the main control module is interrupted.

9. A control method for an autonomous driving control system, applied to a control device for the autonomous driving system, the device comprising a processor and a memory, the memory storing at least one instruction, at least one program, a code set or an instruction set, and the at least one instruction, the at least one program, the code set or the instruction set being loaded and executed by the processor to implement the control method, wherein the autonomous driving control system comprises a main control system and a backup control system, the main control system comprising a main control module and main execution modules, and the backup control system comprising a backup control module and backup execution modules, and the method comprises:

monitoring, by the main control module, an operating status of the main control system in real time;

sending, by the main control module when detecting that a failure occurs in the main control system, a failure notification to the backup control module and a response termination control instruction to each of the main execution modules, the response termination control instruction being a control instruction for instructing each of the main execution modules not to respond to any control over a vehicle; and controlling, by the backup control module after receiving the failure notification, the backup execution modules to start to execute a backup control instruction, wherein the main execution modules comprises a main braking module, a main steering module, and a main power module, and the backup execution module comprises a backup braking module and a backup steering module, the method further comprises:

sending, by the main control module, a main control instruction and a second response control instruction to the main execution modules, the second response control instruction being a control instruction for instructing each of the main execution modules to respond to the main control instruction and instructing each of the backup execution modules to respond to a decomposed main control instruction.

10. The control method according to claim 9, wherein controlling, by the backup control module after receiving the failure notification, the backup execution modules to start to execute the backup control instruction comprises:

sending, by the backup control module after receiving the failure notification, the backup control instruction to the backup execution modules; and executing, by the backup execution modules, the backup control instruction.

11. The control method according to claim 10, further comprising:

decomposing, by the backup control module, the backup control instruction; and sending, by the backup control module, a decomposed backup control instruction to corresponding backup execution modules respectively, such that each of the backup execution modules controls the vehicle according to the decomposed backup control instruction.

12. The control method according to claim 9, further comprising: sending, by the backup control module, the backup control instruction to the backup execution modules;

and correspondingly, controlling, by the backup control module after receiving the failure notification, the backup execution modules to start to execute the backup control instruction comprises:

sending, by the backup control module after receiving the failure notification, a first response control instruction to the backup execution modules, the first response control instruction being a control instruction for instructing each of the backup execution modules to start to respond to the backup control instruction; and starting, by the backup execution modules on the basis of the first response control instruction, to execute the backup control instruction.

13. The control method according to claim 12, further comprising:

decomposing, by the backup control module, the backup control instruction; and sending, by the backup control module, a decomposed backup control instruction to corresponding backup execution modules respectively, such that each of the backup execution modules controls the vehicle according to the decomposed backup control instruction.

14. The control method according to claim 9, further comprising:

determining, by the backup control module, whether communication with the main control module is interrupted, and if so, controlling the backup execution modules to start to execute the backup control instruction.

15. The control method according to claim 9, further comprising:
  determining, by the main execution modules, whether communication with the main control module is interrupted;
  and if so, the main execution modules interrupt work.

* * * * *